May 31, 1927.

C. E. CLOWARD, JR

POULTRY FEEDING DEVICE

Filed Oct. 26, 1925

1,630,831

Inventor

C. E. Cloward, Jr.

By Clarence A. O'Brien

Attorney

Patented May 31, 1927.

1,630,831

UNITED STATES PATENT OFFICE.

CHARLES E. CLOWARD, JR., OF PAYSON, UTAH.

POULTRY-FEEDING DEVICE.

Application filed October 26, 1925. Serial No. 64,901.

This invention relates to improvements in poultry feeding devices, and is more particularly adapted to one particularly for use in feeding baby chicks.

One of the important objects of the present invention is to provide a poultry feeding device which includes a closed receptacle having a series of spaced openings provided in the sides thereof in order that the poultry may gain access to the food or water contained within the receptacle, means being provided for cooperation with the openings for reducing the size thereof so that very young baby chicks can only place their heads through the restricted openings in order to obtain the food or water contained within the receptacle so that there will be no possibility of such chicks entering the receptacle through the openings.

A further object is to provide a poultry feeding device of the above mentioned character wherein said aforementioned means may be gradually raised to gradually uncover the openings as the baby chicks grow older so as to permit the chicks to place their heads through the several openings to gain access to the feed or water within the receptacle.

A still further object is to provide a poultry feeding device of the above mentioned character which is simple in construction, inexpensive, strong and durable and further well adapted to the purpose for which it is designed.

Figure 1:
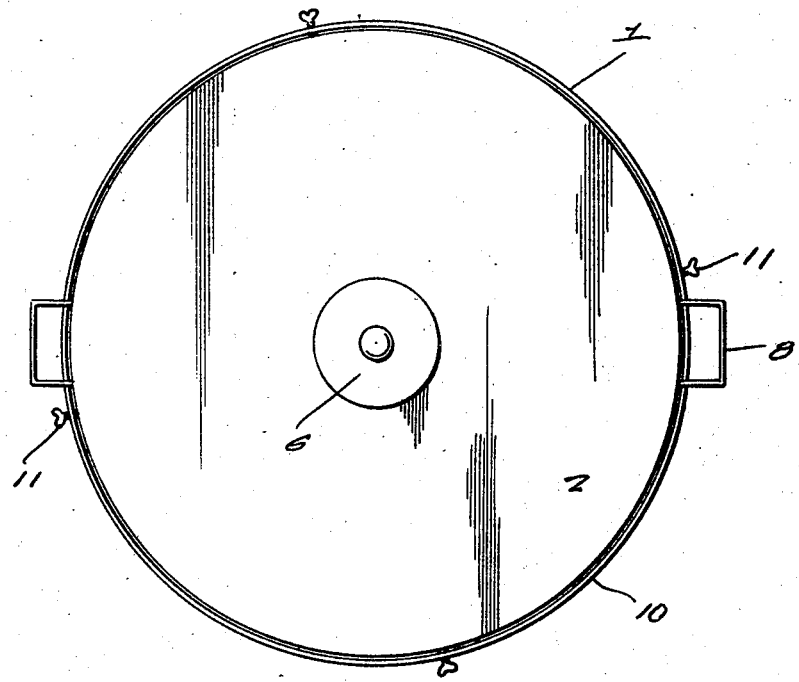
Figure 2:
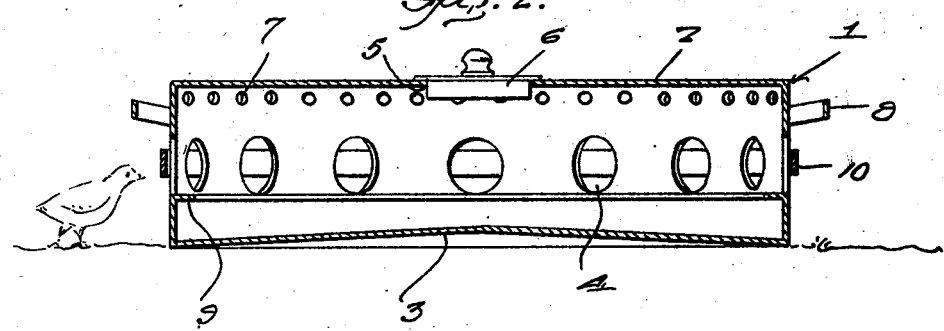

In the accompanying drawing forming a part of this application and in which like numerals designate like parts throughout the same:

Figure 1 is a top plan view of the poultry feeding device embodying my invention, and Figure 2 is a cross sectional view therethrough.

In the drawing, wherein for the purpose of illustration is shown the preferred embodiment of my invention the numeral 1 designates a substantially cylindrical receptacle formed of galvanized sheet metal, the top thereof being closed as illustrated at 2. The receptacle is provided with a substantially conical shaped bottom 3 whereby the feed when placed in the receptacle will by gravity be delivered to the side of the receptacle so that the poultry may reach the feed when their heads are placed through the enlarged openings 4, which openings are arranged in spaced relation in the side of the receptacle.

The top 2 of the receptacle is provided with a central opening 5 whereby the feed may be placed within the receptacle. A suitable closure 6 is provided for the opening 5 as clearly illustrated in Figure 2. An annular series of relatively small vent openings 7 are also formed in the side wall of the receptacle adjacent the top thereof. A pair of diametrically opposed handles 8 are provided at the sides of the receptacle to facilitate the carrying of the same from place to place.

An annular flange 9 is formed on the inner face of the side wall of the receptacle at a point directly below the openings 4 and the purpose thereof is to provide a means for preventing unnecessary waste of the feed when the poultry remove their heads from within the receptacle through the openings 4. This flange may be termed a guard in this respect.

In order to permit the feeding device to be used for feeding very young baby chicks, it is necessary to reduce the size of the openings so that such chicks cannot enter the receptacle and will only be permitted to place their heads through the openings in order to gain access to the food contained within the receptacle, I have provided simple and efficient means for cooperation with said openings, the construction of said means being presently apparent.

The aforementioned means comprises a metallic band 10, the same being of a width slightly less than the diameter of the openings 4, and this band is further of a diameter slightly greater than the diameter of the cylindrical receptacle 1, as is clearly shown in Figure 2. The band 10 is adapted for vertical slidable movement on the outer face of the side wall of the receptacle and is adapted to partially cover the openings in the manner shown in Figure 2. For the purpose of holding the band 10 in its proper adjusted position with respect to the opening 4, I provide the thumb screws 11, the same being threaded through suitable threaded openings provided therefor in the band at spaced intervals, and the inner ends of these thumb screws engage the outer face of the side wall of the receptacle.

It is obvious that as the band 10 is raised, the distance between the lower edge of the band and the bottom or lower portions of the openings 4 will be increased gradually so that as the baby chicks grow older, their heads may be placed through the lower portions of the openings in order to gain access to the food contained within the receptacle. The band will prevent a very small baby check from entering the receptacle through the openings such as frequently results with the poultry feeding devices now generally in use. In this manner, the unnecessary waste of feed will be prevented and furthermore the feed will be kept within the receptacle in a clean and wholesome state.

The receptacle may also be filled with water when it is desired to use the same as a drinking fountain, and the band 10 will cooperate with the openings 4 in the same manner as heretofore described.

It will thus be seen from the foregoing description, that a poultry feeding device has been provided which will enable poultry to gain access to the feed within the receptacle without any possibility of entering the receptacle. The simplicity in which my device is constructed enable the same to be easily and readily filled and furthermore permits the ready and easy adjustment of the band on the receptacle.

While I have shown the preferred embodiment of the invention it is to be understood that minor changes in the size, shape and arrangement of parts may be resorted to without departing from the spirit of the invention and the scope of the appended claims.

Having thus described the invention, what I claim as new and desire to secure by Letters Patent is:—

1. A poultry feeding device comprising a cylindrical receptacle provided with a series of spaced openings in the sides thereof, an annular guard flange arranged on the inner face of the sides of the receptacle at a point directly below said openings, means for reducing the size of said openings, said means comprising a band encircling the receptacle, said band being of a width slightly less than the diameter of said openings, and adapted to partially cover the openings, said band being adapted for vertical slidable movement.

2. A poultry feeding device of the class described comprising a closed cylindrical receptacle, the bottom thereof being conical shaped, the top of said receptacle being provided with a central filling opening, a closure therefor, the side wall of the receptacle being provided with a series of spaced openings, a guard flange arranged on the inner face of the side wall and arranged directly below said openings, a band encircling the receptacle and adapted for vertical movement with respect to the receptacle, said band being of a width slightly less than the diameter of said openings and adapted to partially cover the openings for reducing the size thereof, and thumb screws associated with the band and adapted for engagement with the outer face of the side wall of the receptacle for holding the band in various adjusted positions with respect to the openings.

In testimony whereof I affix my signature.

CHARLES E. CLOWARD, Jr.